(12) United States Patent
Li

(10) Patent No.: US 7,303,174 B2
(45) Date of Patent: Dec. 4, 2007

(54) STRUCTURE OF AN ADJUSTABLE LCD SCREEN

(76) Inventor: Ta Ju Li, PO Box 82-144, Taipei (TW)

( * ) Notice: Subject to any disclaimer, the term of this patent is extended or adjusted under 35 U.S.C. 154(b) by 0 days.

(21) Appl. No.: 10/184,978

(22) Filed: Jul. 1, 2002

(65) Prior Publication Data
US 2003/0132360 A1    Jul. 17, 2003

(30) Foreign Application Priority Data
Jan. 11, 2002    (TW) .............................. 91200128 U

(51) Int. Cl.
*A47B 91/00*    (2006.01)
(52) U.S. Cl. ................. 248/346.06; 248/919; 361/681; 348/825
(58) Field of Classification Search ........... 248/289.11, 248/346.01, 346.04, 346.06, 349.1, 346.5, 248/917, 919, 131, 144; 348/825, 827; 16/367; 312/7.2; 361/681, 682
See application file for complete search history.

(56) References Cited
U.S. PATENT DOCUMENTS

| | | | | |
|---|---|---|---|---|
| 4,415,136 A | * | 11/1983 | Knoll | 248/181.2 |
| 4,781,347 A | * | 11/1988 | Dickie | 248/183.1 |
| 5,024,415 A | * | 6/1991 | Purens | 248/349.1 |
| 5,685,514 A | * | 11/1997 | Carnahan et al. | 248/425 |
| 6,742,221 B2 | * | 6/2004 | Lu et al. | 16/367 |
| 7,024,729 B2 | * | 4/2006 | Chang et al. | 16/367 |

FOREIGN PATENT DOCUMENTS

JP    08032899 A    *    2/1996

\* cited by examiner

*Primary Examiner*—A. Joseph Wujciak, III

(57) ABSTRACT

An adjustable LCD screen is provided. The LCD screen is adjustable through 360 degrees. the inclination angle of the LCD is also adjustable. The LCD screen comprises a base seat having a top and a bottom side respectively mounted with a top groove and a bottom groove of co-axial; a top ring having a lower section being engaged with the top groove a bottom ring being engaged with the bottom groove a base plate mounted at the bottom section of the base seat a base seat plate covered the bottom section of the base seat; a rotating disc matching with the top groove at the bottom section a supporting seat;a string seat fixed to the fixed board; a supporting seat cover mounted to the rear side of the supporting seat; a screen having a rear side provided with a cavity; and a screen rear cover mounted onto the cavity.

22 Claims, 6 Drawing Sheets

US 7,303,174 B2

STRUCTURE OF AN ADJUSTABLE LCD SCREEN

BACKGROUND OF THE INVENTION (A) Technical Field

The present invention relates to structure of a LCD screen, and in particular, a LCD screen which is adjustable in an axial direction and in inclination angle.

(B) Brief Description of the Prior Art

Taiwanese Patent Publication No. 351151, 351510, and 410988 disclose a LCD screen having a holding seat positioned at the bottom seat thereof. A protruded edge at the holding seat engages with a sliding groove of the bottom seat such that the holding seat can rotate an appropriate angle on the bottom seat. However, due to the entire weight of the LCD is exerted onto the bottom seat, a great force is required in order to rotate or adjust the angle of the LCD screen. In addition, the dust collected on the bottom seat will further deter the rotating of the LCD screen. As a result, the LCD screen may not be rotatable after an extended period of time. Accordingly it is an object of the present invention to provide an improved structure of a LCD screen which can be rotated smoothly, wherein the above drawbacks are overcome.

SUMMARY OF THE INVENTION

Accordingly it is an object of the present invention to provide an improved structure of a LCD screen, wherein the LCD screen can be adjusted in 360 degree and the inclination angle of the LCD can also be adjusted.

Yet another object of the present invention is to provide an improved structure of an adjustable LCD screen, wherein a positioning pivotal rod is provided to position the LCD screen on a supporting seat.

Other objects and advantages are apparent by reading the detailed description together with accompanying drawings.

DETAILED DESCRIPTION OF THE PRESENT INVENTION

Figure 1:
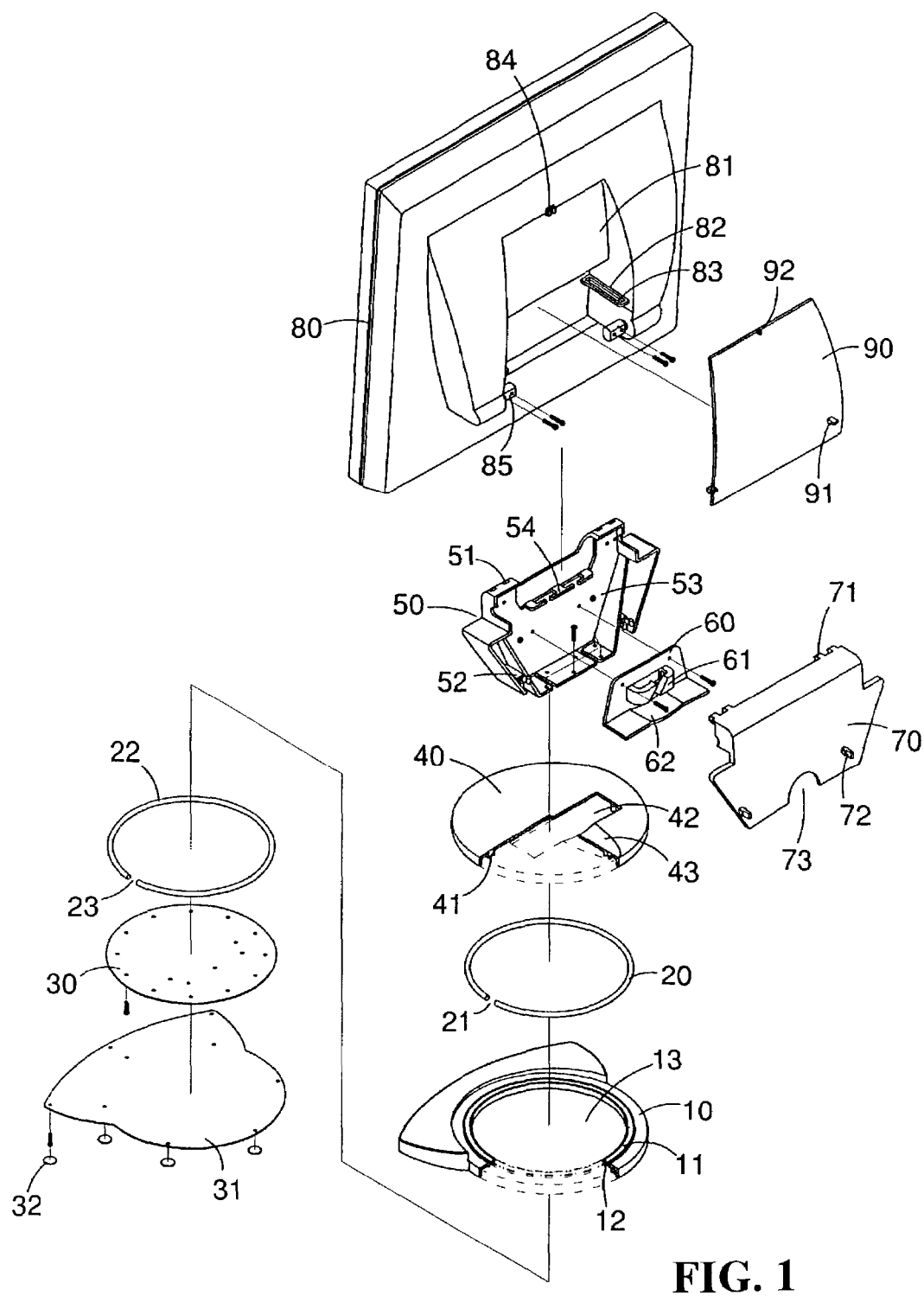
FIG. 1 is a perspective exploded view of the present invention.

Referring to FIGS. 1 to 4, there is shown an improved structure of an adjustable LCD screen comprising (a) a base seat 10 having a top and a bottom side respectively mounted with a top groove 11 and a bottom groove 12 of co-axial, and the inner side of the base seat 10 of the top groove 11 and the bottom groove 12 being provided with a circular hole 13;

(b) a top ring 20 having a lower section being engaged with the top groove 11 and the top ring 20 being made from a wear-resistant and of low coefficient of friction material, a notch 21 being provided to the top ring 20 facilitating the engagement with the top groove 11;

(c) a bottom ring 22 having a upper section being engaged with the bottom groove 12 and the bottom ring 22 being made from a wear-resistant and of low coefficient of friction material, and a notch 23 being provided tot he bottom ring 22 facilitating the engagement with the bottom groove 12;

(d) a base plate 30 mounted at the bottom section of the base seat 10 and the bottom ring 22 being urged at the bottom groove 12;

(e) a base seat plate 31 covered the bottom section of the base seat 10 for sealing the bottom face thereof, the bottom seat plate 31 being provided with a plurality of spongy pads 32 to cover the screw hole on the bottom seat plate 31 and to provide skidding prevention to the LCD screen on the table;

(f) a rotating disc 40 having a disc groove 41 matching with the top groove 11 at the bottom section, allowing the top section of the top ring 20 to be engaged thereto, and an engaging groove 42 being provided on the rotating disc 40 such that one side of the engaging groove 42 having a recess 43 can be passed through by wires;

(g) a supporting seat 50 having a bottom edge urged at the bottom seat 10 and the top side of the supporting seat 50 being provided with a plurality of fastening hole 51, and the two sides of the bottom section being provided with a resilient fastening clip 52 and the lateral being provided with a fixed board 53, the top edge of the fixed board 53 being provided with a plurality of string hook plates 54, and the bottom section of the fixed board 53 engaged with the engaging groove 42 of the rotating disc 40 and being secured at the base plate 30;

(h) a string seat 60 fixed to the fixed board 53 and the engaging groove 42 being covered, and the string seat 60 being provided with a plurality of string hooks 61 and the bottom section being provided with a recess 62 for a wire to pass through;

(i) a supporting seat cover 70 mounted to the rear side of the supporting seat 50 and the top side being provided with a plurality of fastening hook 71 for mounting with a fastening hole 51 of the supporting seat 50 and the two side of the bottom section being provided with a protruded hook 72 for mounting to the resilient fastening clip 52 of the supporting seat, and the bottom section of the supporting seat cover 70 being provided with a notch 73 for a wire to be extended outward;

(j) a screen 80 having a rear side provided with a cavity 81 which has two sides rotatably mounted with a positioning pivotal rods 85, a plurality of connectors being provided to the cavity 81 for the connection of power source wire or other connection wires, a positioning plate 82 being provided to the two sides of the cavity and a hook hole 83 being provided with the fixed plate, the top side of the cavity being a resilient fastening clip 84, the rod 85 being provided with one end mounted onto the fixed board 53; and (k) a screen rear cover 90 mounted onto the cavity 81 and the two sides of the bottom section being provided with a protruded hook 91 for mounting with the hook hole 83 of the fixed board 82, and the top side of the screen rear cover 90 being protruded with a fastening hook 92 for mounting with the resilient fastening clip 84 of the cavity.

Figure 2:
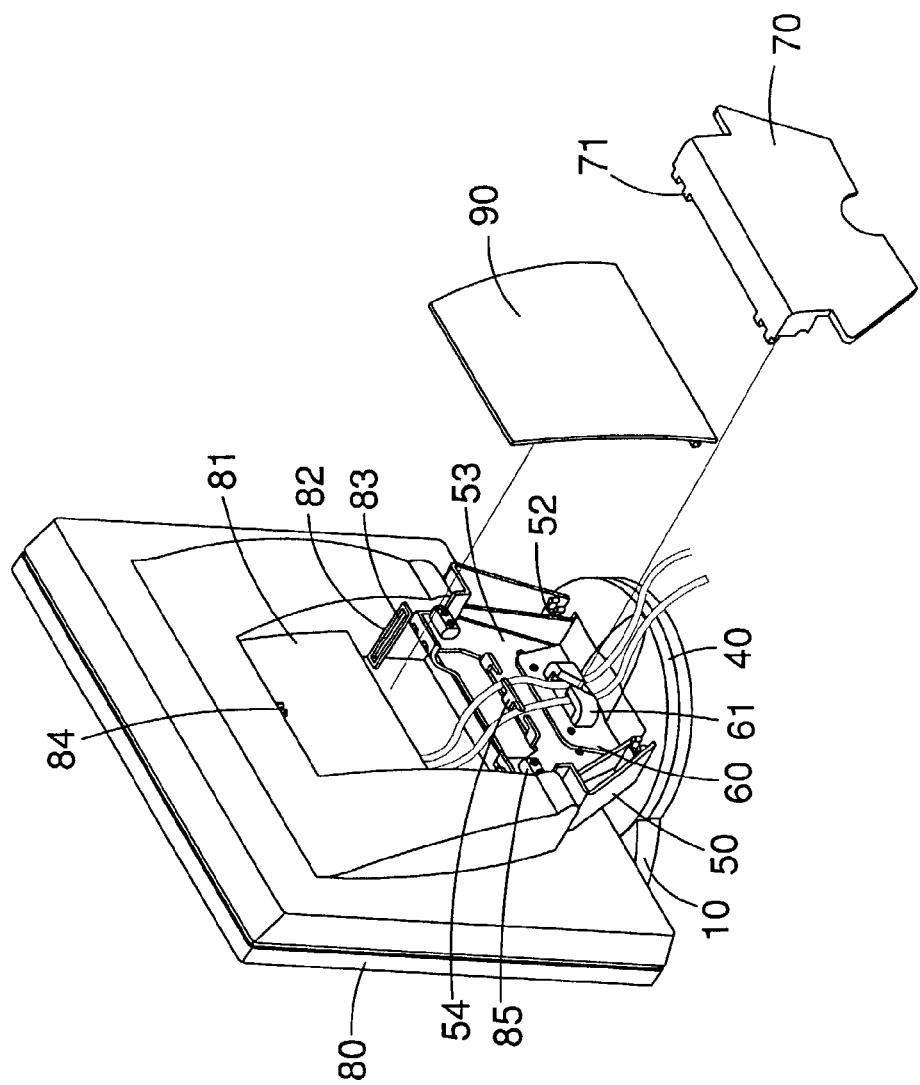
FIG. 2 is a perspective view showing the opening of the rear cover and the supporting seat cover of the present invention.
Figure 3:
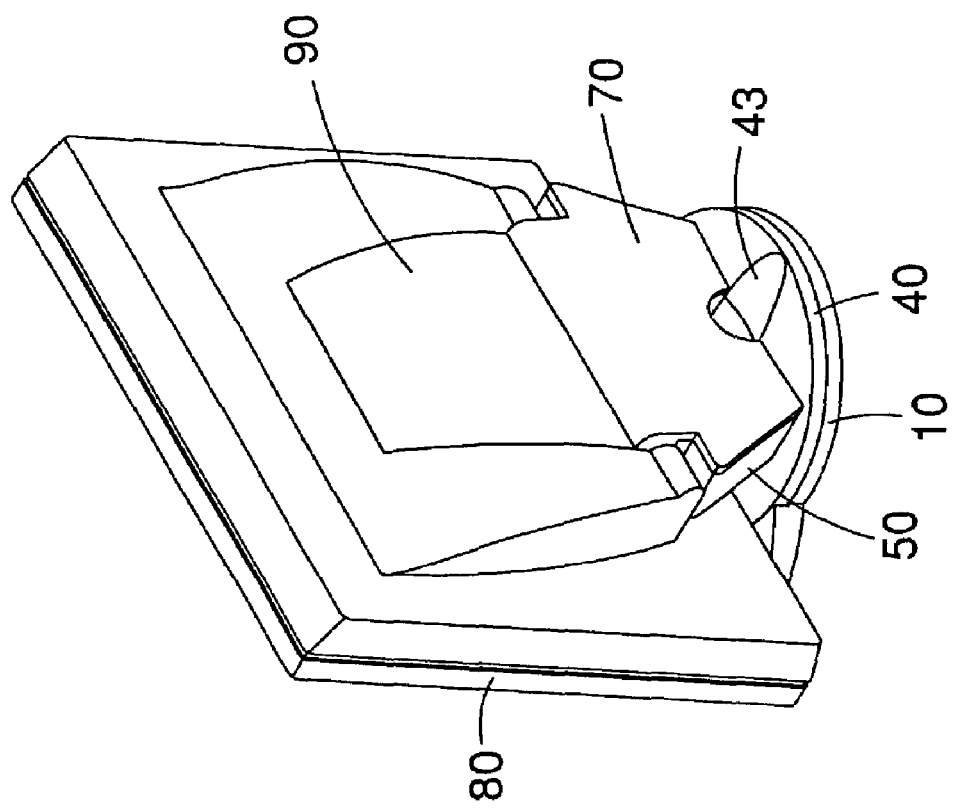
FIG. 3 is a perspective view of the present invention.

Referring to FIG. 2, the wire of the LCD screen is extended into the supporting seat 50 from the bottom side of the cavity and is positioned at the string hook 61 of the string seat 60 after it passes through the string hook plate 54 of the fixed board 53. The wire is extended out via the notch 73 at the bottom section of the supporting seat cover 70.

Figure 4:
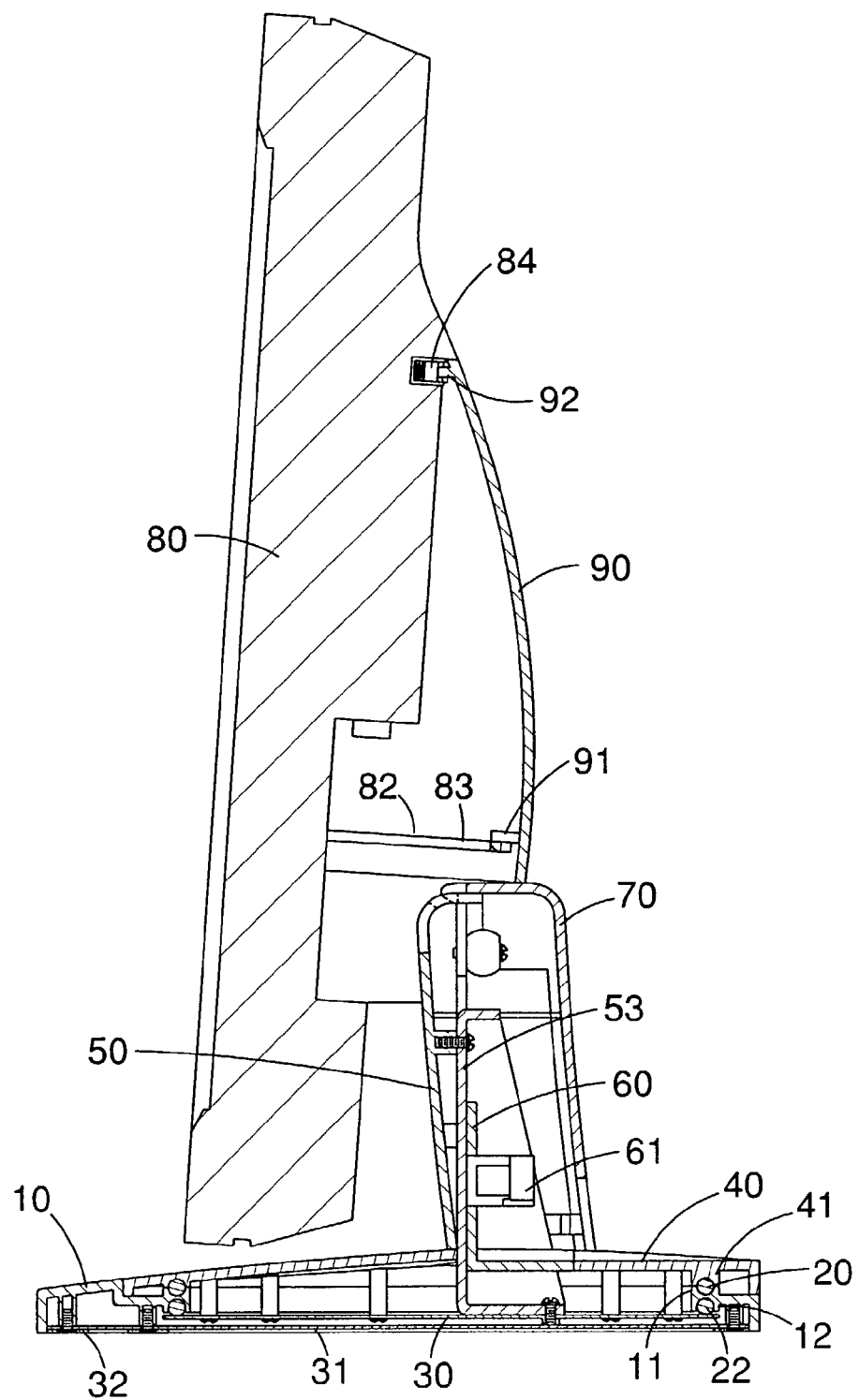
FIG. 4 is a sectional view of the present invention.
Figure 5:
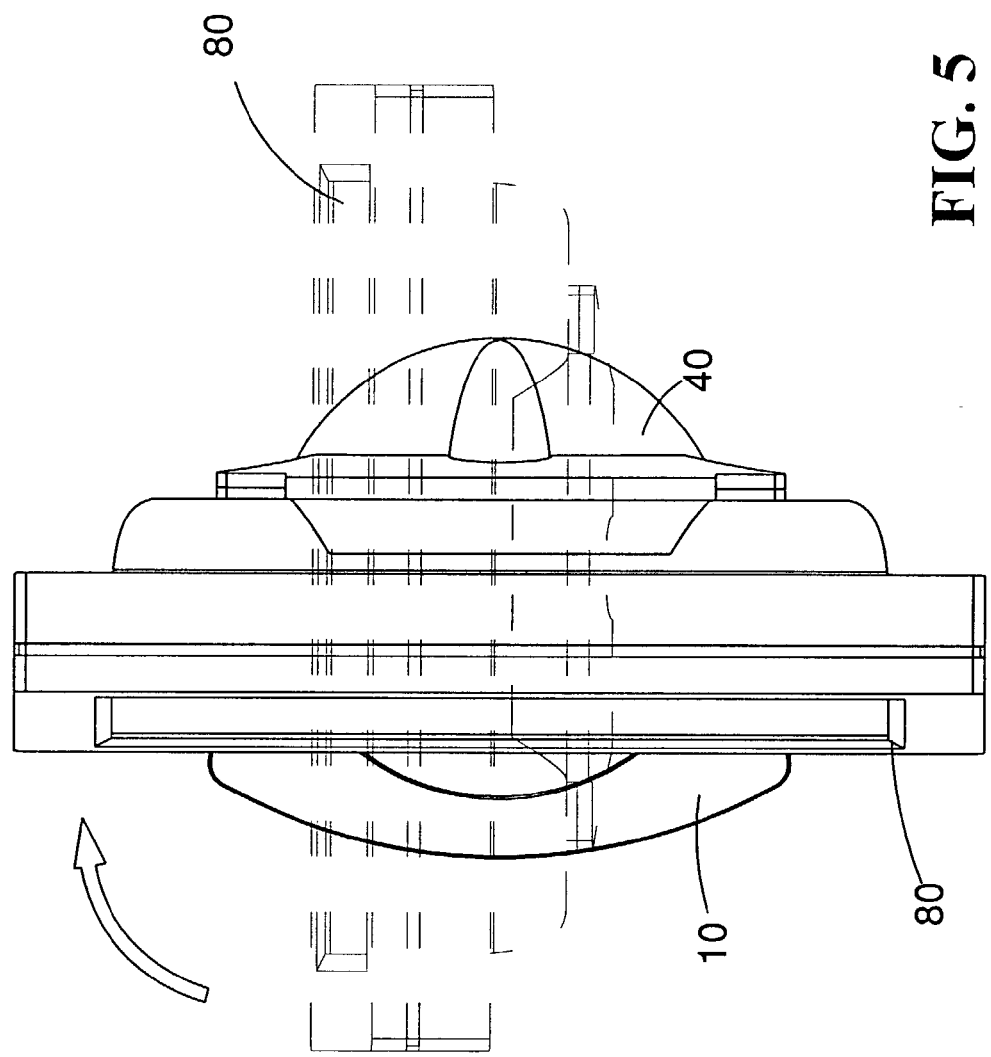
FIG. 5 schematically shows the axial rotation of the present invention.

Referring to FIGS. 4 and 5, the top ring 20 is engaged at the top groove 11 and the disc groove 41, and the base board 30 is used to urged the bottom groove 12 of the base seat 10, the rotating disc 40 and the base board 30 are guided by the top groove 11, the bottom groove 12 and the disc groove 41 such that the base seat 10 can be rotated in 360 degree. Further the weight of the LCD screen is positioned onto the top and bottom contacts of the top ring 20 and the top ring 20 and the bottom ring 22 are made from wear resistant material or a low coefficient of friction material, the axial rotation of the LCD screen is very smooth. In addition, the rotation of the rotating disc 40 only requires the contact of the top ring with the top groove 11 and the disc groove 41, the area of contact is small, resulting small resistance to friction. Accordingly the LCD can be rotated smoothly. In addition, the contacting face for rotation is located at the base seat 10 and the interior of the rotating disc 40 without exposing to the outside, there will not have dust particles to cause resistance of rotation.

Figure 6:
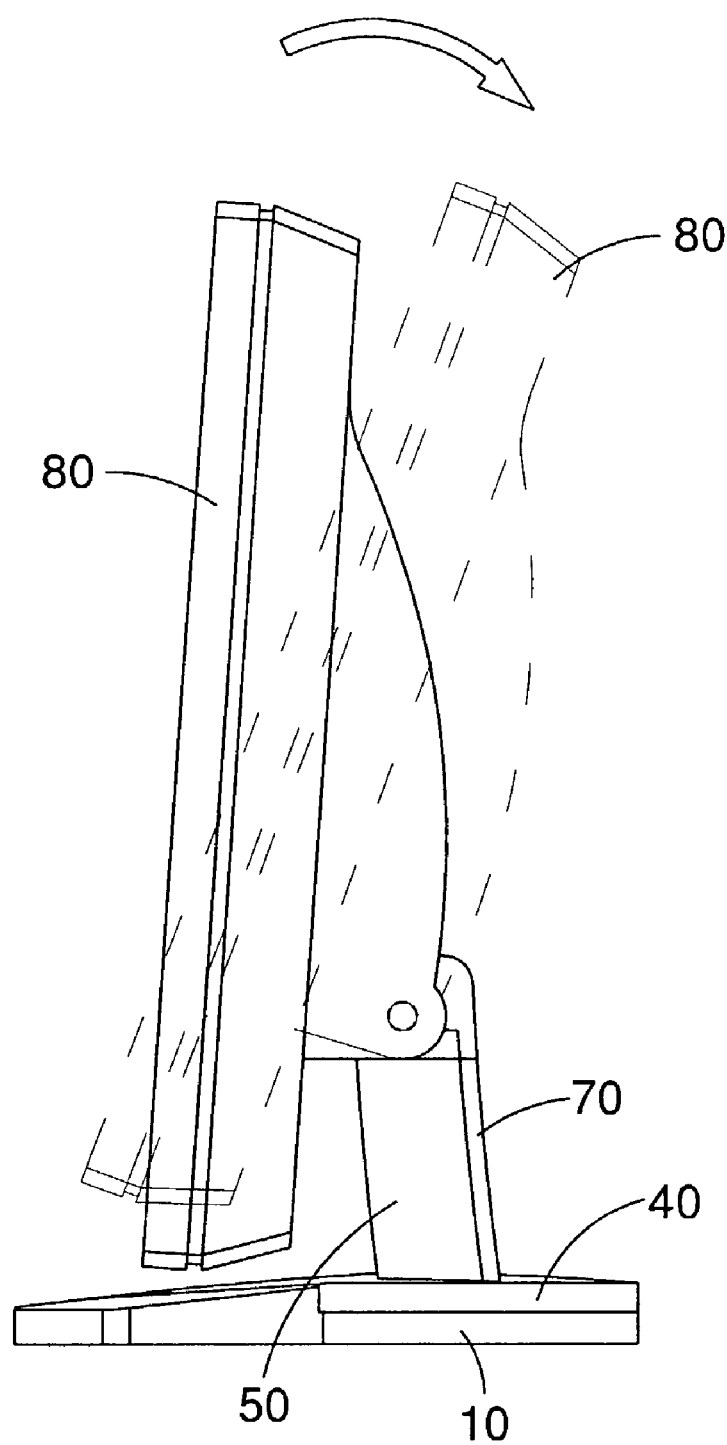
FIG. 6 schematically shows the adjustment of the elevation angle of the present invention.

Referring to FIGS. 2 and 6, a positioning pivotal rod is positioned at the fixed board 53, the LCD screen 80 can be adjusted at an inclined angle about the positioning pivotal rod 85.

While the invention has been described with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

The invention claimed is:

1. An improved structure of an adjustable LCD screen comprising (a) a base seat having a top and a bottom side respectively mounted with a top groove and a bottom groove of co-axial, and the inner side and the base seat at the top groove being provided with a circular hole; (b) a top ring having a lower section being engaged with the top groove and the top ring being made from a wear-resistant and low coefficient of friction material; (c) a bottom ring having a upper section being engaged with the bottom groove and the bottom ring being made from a wear-resistant and low coefficient of friction material; (d) a base plate mounted at the bottom section of the base seat and the bottom ring being urged at the bottom groove; (e) a base seat plate covered the bottom section of the base seat for sealing the bottom face thereof; (t) a rotating disc having a disc groove matching with the top groove at the bottom section allowing the top section of the top ring engaged thereto, and an engaging groove being provided on the rotating disc; (g) a supporting seat having a fixed board engaged with the engaging groove and being secured at the base plate; (h) a string seat fixed to the fixed board and the engaging groove being covered, and the string seat being provided with a string hook; (i) a supporting seat cover mounted to the rear side of the supporting seat and the bottom section thereof being a notch; (j) a screen having a rear side provided with a cavity which has two sides rotatably mounted with a positioning pivotal rod, the rod being provided with one end mounted onto the fixed board; and (k) a screen rear cover mounted onto the cavity; whereby the LCD screen is pivotally mounted on the supporting seat to allow the screen to pivot in variety angle and the screen is rotatably supported by the rotating disc.

2. The improved structure of an adjustable LCD screen of claim 1, wherein the top and the bottom groove are provided with a notch.

3. The improved structure of an adjustable LCD screen of claim 1, wherein the base seat is provided with a plurality of spongy pads for covering the screws on the base seat and for skidding protection on a table top.

4. The improved structure of an adjustable LCD screen of claim 1, wherein one side of the engaging groove of the rotating disc is provided with a recess allowing wires to pass through.

5. The improved structure of an adjustable LCD screen of claim 1, wherein the bottom edge of the supporting seat is pressed at the base seat and the top side of the supporting seat is provided with a plurality of fastening holes and the two sides of the bottom section of one side are provided with a resilient fastening clip for the securing of the supporting seat covering hook.

6. The improved structure of an adjustable LCD screen of claim 5, wherein the top side of the supporting seat cover is provided with a plurality of fastening hook for mounting to the fastening hole of the supporting seat and the two sides of the bottom section are mounted with a protruded hook for mounting with the resilient fastening clip.

7. The improved structure of an adjustable LCD screen of claim 1, wherein the top edge of the fixed board is provided with a plurality of string hook plate.

8. The improved structure of an adjustable LCD screen of claim 1, wherein the bottom section of the string seat is provided with a recess allowing cable to pass through.

9. The improved structure of an adjustable LCD screen of claim 1, wherein the cavity of the screen is provided with a plurality of connectors for connection with power source wires or other connection wires, and the two sides of the cavity are provided with a fixed plate having a hook hole, and the top side of the cavity is provided with a resilient fastening clip for securing with the screen rear cover hook.

10. The improved structure of an adjustable LCD screen of claim 9, wherein the lower section of the two side of the screen rear cover are provided with a protruded hook for mounting to the hook hole of the fixed plate and the top side of the screen rear cover is provided with a fastening hook for mounting with the resilient fastening clip.

11. An improved structure supporting an adjustable LCD screen with a supporting seat having positional pivotal rods pivotally mounted supporting screen which is adjustable in axial and elevational direction, and the bottom section of the supporting seat has a rotating disc and a base seat to support the supporting seat, characterized in that a top and bottom sides of the base seat are mounted with a top groove and a bottom groove of co-axial and the inner side of the base seat at the top groove being provided with a circular hole, a top ring having a lower section being engaged with the top groove and the bottom section of the rotating disc, the rotating disc comprising a the rotating disc groove and; the groove being engageable with the upper section of the top ring, and the bottom groove being positioned at the bottom section of the base seat and a bottom ring urges the bottom groove, wherein the LCD screen is rotatably supported by the rotating disc when rotating on the top ring.

12. The improved structure of an adjustable LCD screen with a supporting seat of claim 11, wherein the top and the bottom groove are provided with a notch.

13. The improved structure of an adjustable LCD screen with a supporting seat of claim 11, wherein the bottom section of the base seat is provided with a base seat board to cover the bottom face thereof.

14. The improved structure of an adjustable LCD screen with a supporting seat of claim 11, wherein the base seat is provided with a plurality of spongy pads for covering the screws on the base seat board and for skidding protection on a table top.

15. The improved structure of an adjustable LCD screen with a supporting seat of claim 11, wherein one side of the engaging groove of the rotating disc is provided with a recess allowing wires to pass through.

16. The improved structure of an adjustable LCD screen with a supporting seat of claim 15, wherein the bottom edge of the supporting seat presses at the base seat and one side thereof is a fixed board having a top edge being provided with a plurality of string hook plates, the bottom section of the fixed board being engaged with the engaging groove of the rotating disc and being fixed at the base board.

17. The improved structure of an adjustable LCD screen with a supporting seat of claim 16, wherein the fixed board is provided with a string seat having provided with a plurality of string hooks, and the bottom section thereof being a recess for wires to pass through.

18. The improved structure of an adjustable LCD screen with a supporting seat of claim 16, wherein the positioning pivotal rod has one end mounted to the fixed board.

19. The improved structure of an adjustable LCD screen with a supporting seat of claim 11, wherein the top side of the supporting seat is provided with a plurality of fastening holes and two sides of the bottom section of one lateral side of the supporting seat are provided respectively with a resilient fastening clip for securing to a supporting seat cover engaging clip.

20. The improved structure of an adjustable LCD screen with a supporting seat of claim 19, wherein the top side of the supporting seat cover is provided with a plurality of fastening hook for mounting with fastening hole of the supporting seat, and the two lateral sides of the bottom section are provided with a protruded hook for mounting with the resilient fastening clip, and the bottom section of the supporting seat cover is provided with a notch for the wire to pass through and to extend to outside.

21. The improved structure of an adjustable LCD screen with a supporting seat of claim 11, wherein the cavity of the screen is provided with a plurality of connectors for connection with power source wires or other connection wires, and the two sides of the cavity are provided with a fixed plate having a hook hole, and the top side of the cavity is provided with a resilient fastening clip for securing with the screen rear cover hook, and the bottom section of the two lateral sides of the cavity are respective provided with a positioning pivotal rod for pivotally mounted to the supporting seat.

22. The improved structure of an adjustable LCD screen with a supporting seat of claim 20, wherein the screen rear cover is covered at the top section of the cavity and the two sides of the bottom section are respectively mounted with a protruded hook for mounting with the hook hole of the fixed board and the top side of the screen rear cover is provided with a fastening hook for mounting to the resilient fastening hook.

* * * * *